(12) United States Patent
Kouchi et al.

(10) Patent No.: US 11,884,354 B2
(45) Date of Patent: Jan. 30, 2024

(54) VEHICLE

(71) Applicant: KAWASAKI MOTORS, LTD., Akashi (JP)

(72) Inventors: Kaoru Kouchi, Kakogawa (JP); Shusei Ueno, Kobe (JP)

(73) Assignee: KAWASAKI MOTORS, LTD., Akashi (JP)

( * ) Notice: Subject to any disclaimer, the term of this patent is extended or adjusted under 35 U.S.C. 154(b) by 738 days.

(21) Appl. No.: 16/828,627

(22) Filed: Mar. 24, 2020

(65) Prior Publication Data
US 2020/0307739 A1 Oct. 1, 2020

(30) Foreign Application Priority Data
Mar. 28, 2019 (JP) .................................. 2019-062486

(51) Int. Cl.
*B62K 23/04* (2006.01)
*B62J 50/22* (2020.01)
*B62K 11/14* (2006.01)

(52) U.S. Cl.
CPC ............... *B62K 23/04* (2013.01); *B62J 50/22* (2020.02); *B62K 11/14* (2013.01)

(58) Field of Classification Search
CPC ........ B62K 23/04; B62K 11/14; B62K 23/02; B62K 23/06; B62J 50/225
See application file for complete search history.

(56) References Cited

U.S. PATENT DOCUMENTS

| 2007/0219697 A1 | 9/2007 | Unterforsthuber |
| 2008/0105483 A1 | 5/2008 | Dugas |
| 2012/0138375 A1 | 6/2012 | Hughes |

FOREIGN PATENT DOCUMENTS

| DE | 10 2006 012 515 | | 9/2007 |
| EP | 1 216 911 | | 6/2002 |
| EP | 1 454 787 | A2 | 9/2004 |
| GB | 2510939 | A | 8/2014 |
| JP | S53-045645 | | 4/1978 |
| JP | H11205914 | A | 7/1999 |
| JP | 11291964 | | 10/1999 |
| JP | 11291964 | A * | 10/1999 |
| JP | 2000175305 | | 6/2000 |
| JP | 2002-369316 | A | 12/2002 |
| JP | 4205972 | B2 | 1/2009 |

(Continued)

OTHER PUBLICATIONS

SCK "Lambretta Katalog", 2006, pp. 159.

*Primary Examiner* — Jeremy R Severson
(74) *Attorney, Agent, or Firm* — Fay Kaplun & Marcin, LLP

(57) ABSTRACT

A vehicle includes a propulsion power source, a handlebar, an output adjusting grip, and a torque operation member. The handlebar is operable to steer the vehicle. The output adjusting grip is disposed on either a right or left portion of the handlebar operably so that an output level of the propulsion power source is adjusted by rotating the output adjusting grip relative to the handlebar. The torque operation member is operable to issue a command to change a torque output characteristic of the propulsion power source. The torque operation member is disposed on the same right or left portion of the handlebar with the output adjusting grip rotatably integrally with the output adjusting grip.

16 Claims, 5 Drawing Sheets

First Embodiment

(56) References Cited

FOREIGN PATENT DOCUMENTS

| | | |
|---|---|---|
| JP | 5824498 B2 | 11/2015 |
| JP | 2019038512 | 3/2019 |
| WO | 2018/060860 | 5/2018 |

* cited by examiner

VEHICLE

CROSS-REFERENCE TO RELATED APPLICATIONS

This application claims priority based on the Paris Convention based on Japanese Patent Application Serial No. 2019-062486 filed on Mar. 28, 2019, the contents of which are included below.

FIELD

At least one embodiment of the present invention relates to a vehicle equipped with a handlebar and an output adjusting grip.

BACKGROUND

A conventional well-known vehicle, such as a motorcycle, is equipped with a handlebar operable to steer the vehicle, and an output adjusting grip operable so that the output adjusting grip is rotated relative to the handlebar to adjust an output level of a propulsion power source of the vehicle. The output adjusting grip is normally provided on either a right or left portion of the handlebar.

A conventional well-known vehicle referred to as a hybrid car is equipped with a propulsion power source consisting of an internal combustion engine and an electric motor. As disclosed by JP 5824498 B, a kind of hybrid car is configured so that a drive mode of the propulsion power source can be shifted to a boost mode to drive both the internal combustion engine and the electric motor so as to change a torque output characteristic of the propulsion power source.

The above-mentioned disclosed hybrid car is configured so that a millage for executing the boost mode is determined depending on an amount of energy supply in an electric energy storage device and an amount of combustion fuel in a tank.

A conventional well-known electric vehicle having an electric motor serving as a propulsion power source is equipped with a device for executing a boost mode or a power mode to increase a value of current supplied to the electric motor. For example, the device is a driver of an electric motorcycle as disclosed by JP 4205972 B, an acceleration control device of an electric vehicle as disclosed by JP 2002-369316 A, or an output control device of an electric vehicle as disclosed by JP H11-205914 A.

During a travel operation of the vehicle such as the motorcycle, an operator (rider) constantly grips right and left grips (either the right or left grip serves as the output adjusting grip) of the handlebar with his/her hands, and adjusts the output level of the propulsion power source by rotating the output adjusting grip relative to the handlebar in correspondence to various situations. Also, if the operator wants to shift the drive mode of the propulsion power source to the boost mode, the operator may need to operate a mode-setting operation member (serving as a torque operation member), e.g., push a button, to issue a mode-shift command. However, the operation of the mode-setting operation member may be difficult because the relative position of the operator's hand gripping the output adjusting grip to the mode-setting operation member unrotatably provided at a fixed position on the handlebar is changed according to rotation of the output adjusting grip for adjusting the output level of the propulsion power source.

SUMMARY

The present invention relates to a vehicle which can easily shift a drive mode of a propulsion power source to a boost mode even in a state where an output adjusting grip has been rotated to a large degree in an output-increasing direction.

In a first exemplary embodiment, a vehicle comprises a propulsion power source, a handlebar, an output adjusting grip, and a torque operation member. The handlebar is operable to steer the vehicle. The output adjusting grip is provided on either a right or left portion of the handlebar operably so that an output level of the propulsion power source is adjusted by rotating the output adjusting grip relative to the handlebar. The torque operation member is operable to issue a command of changing a torque output characteristic of the propulsion power source. The torque operation member is provided on the same right or left portion of the handlebar with the output adjusting grip so as to be rotatable integrally with the output adjusting grip.

Therefore, a position of the torque operation member relative to the output adjusting grip is constant regardless of rotation of the output adjusting grip relative to the handlebar. Accordingly, the torque operation member can be easily operated by a finger of an operator's hand gripping and rotating the output adjusting grip.

In a second embodiment, a vehicle comprises a propulsion power source, a handlebar, and an output adjusting grip. The handlebar is operable to steer the vehicle. The output adjusting grip is provided on either a right or left portion of the handlebar operably so that an output level of the propulsion power source is adjusted by rotating the output adjusting grip relative to the handlebar. The output adjusting grip is configured so that a command to change a torque output characteristic of the propulsion power source can be issued by rotating the output adjusting grip further in an output-increasing direction from a predetermined rotation angle after the output adjusting grip rotated in the output-increasing direction reaches the predetermined rotation angle.

Therefore, the command to change the torque output characteristic (i.e., the torque output characteristic changing command) can be easily issued while the output adjusting grip is gripped and rotated by an operator's hand. The output adjusting grip operable to adjust the output level is also operable to issue the torque output characteristic changing command, thereby reducing production costs of the vehicle.

Due to each of the embodiments, the vehicle can shift a drive mode of the propulsion power source to a boost mode even in a state where the output adjusting grip has been rotated to a large degree in the output-increasing direction.

The above and other features and effects of the vehicle according to the present application will become more apparent from the following detailed description with reference to the accompanying drawings.

BRIEF DESCRIPTION OF THE D WINGS

Embodiments will now be described, by way of example only, with reference to the accompanying drawings which are meant to be exemplary, not limiting, and wherein like elements are numbered alike in several Figures, in which.

DETAILED DESCRIPTION

Figure 1:
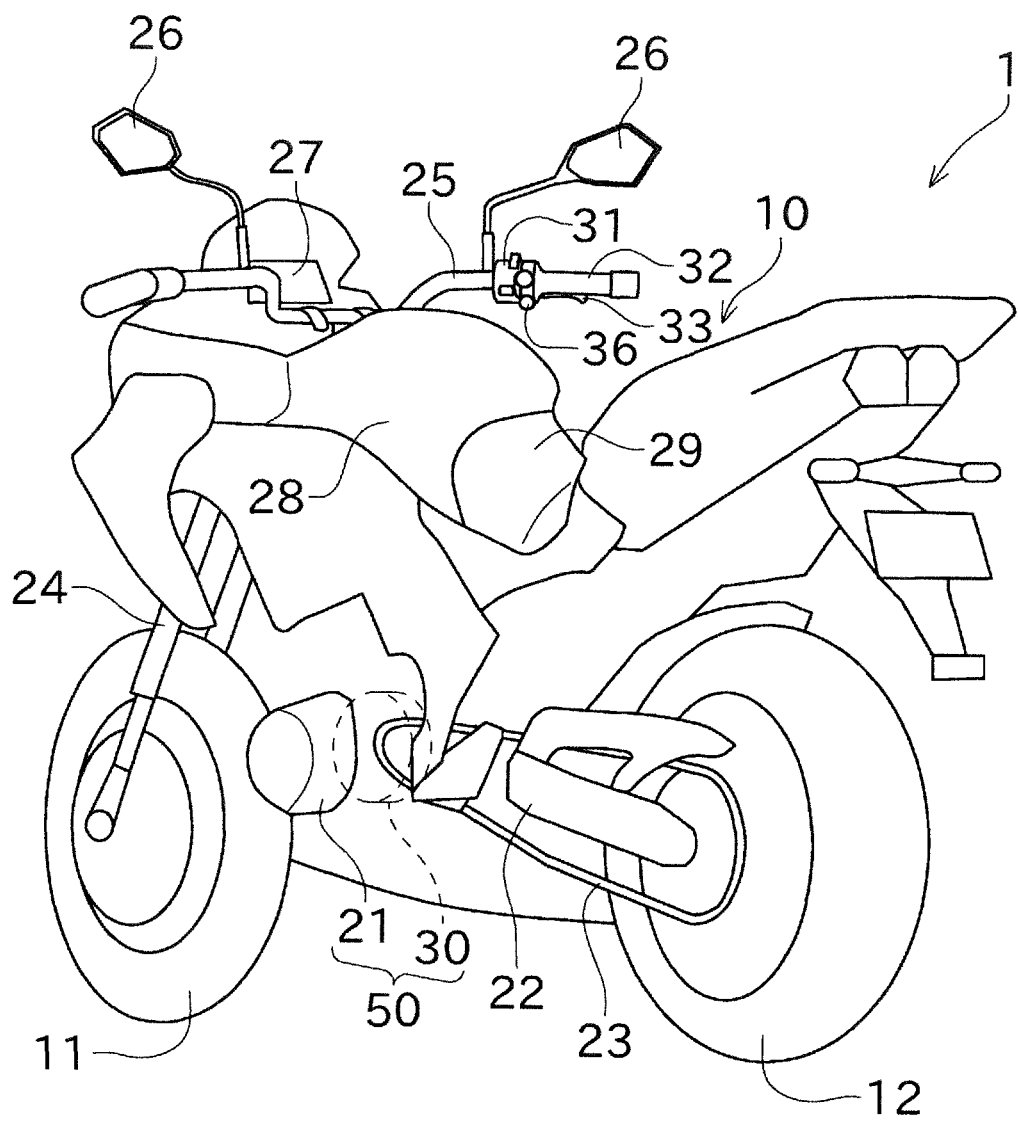
FIG. 1 is a perspective rear view of a motorcycle.
Figure 2:
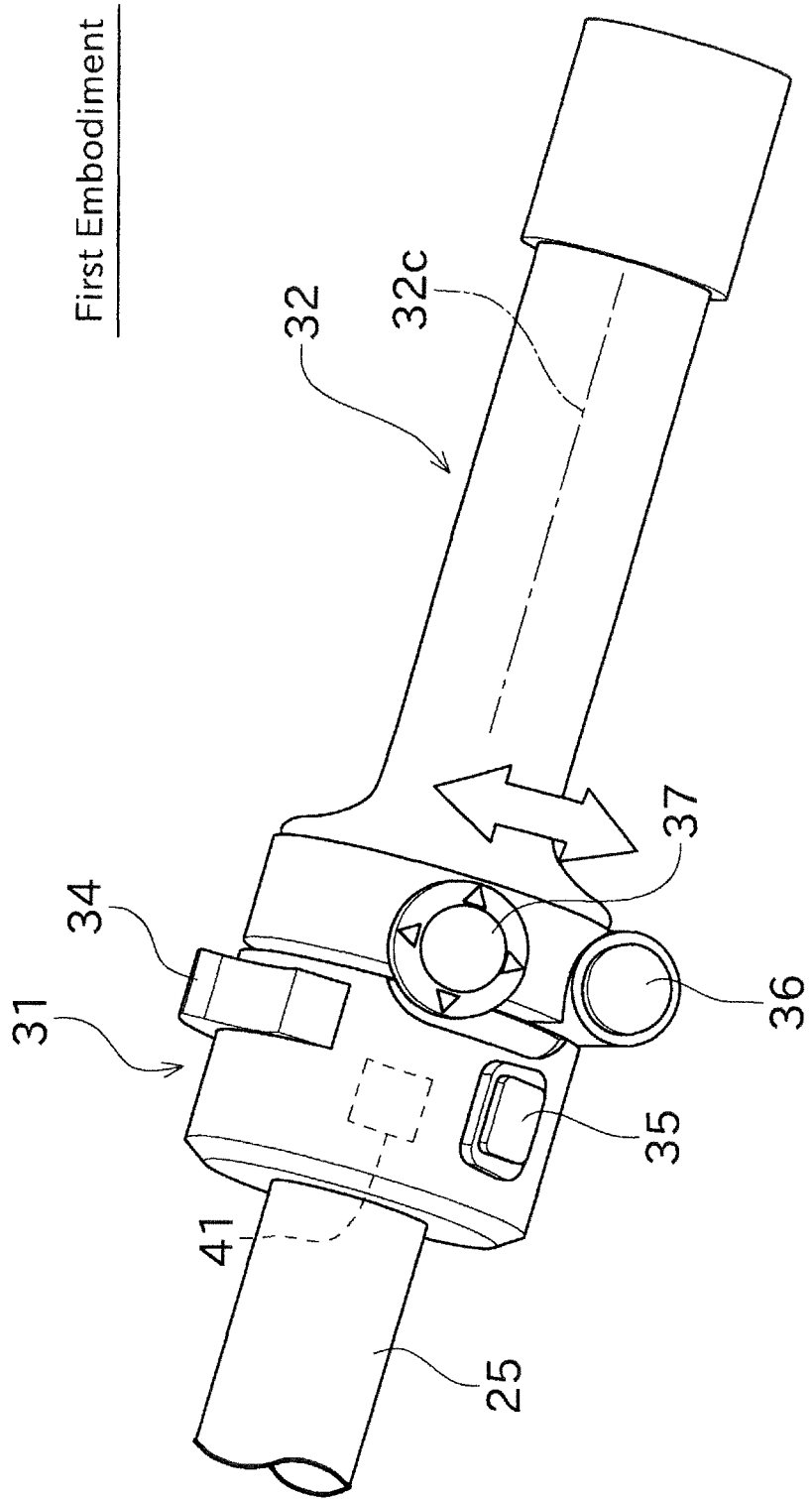
FIG. 2 is a perspective view of an output adjusting grip and a casing according to a first embodiment.
Figure 3:
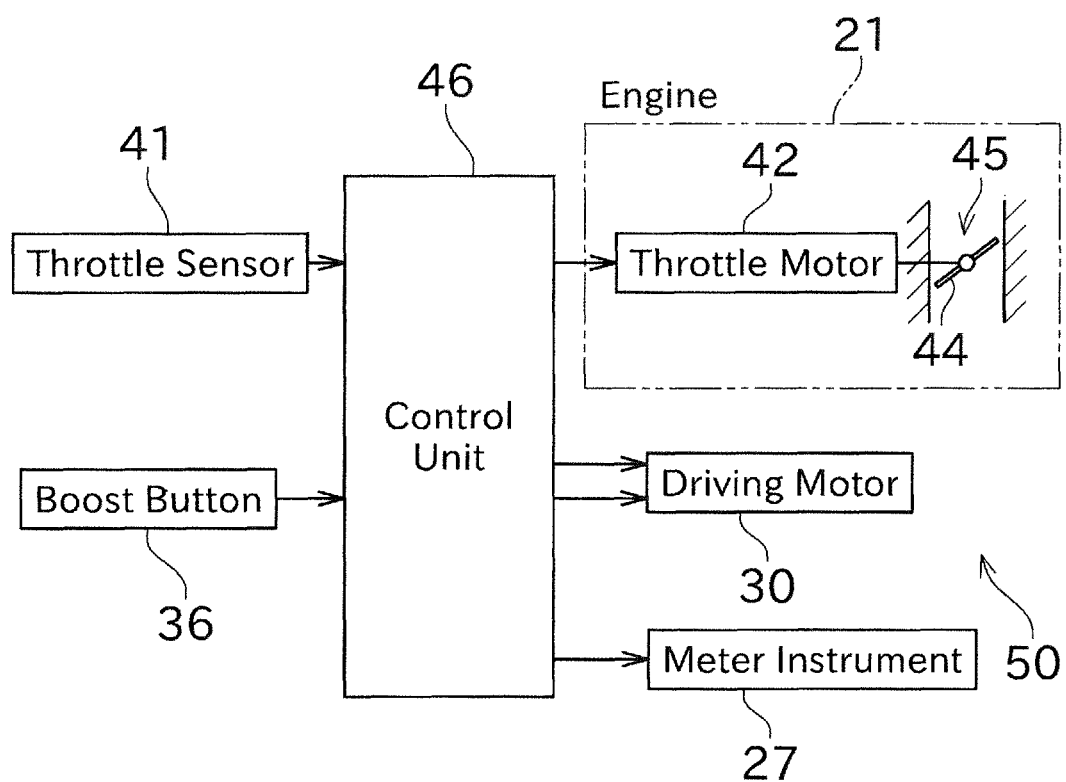
FIG. 3 is a block diagram of an electric system for controlling a hybrid power source.
Figure 4:
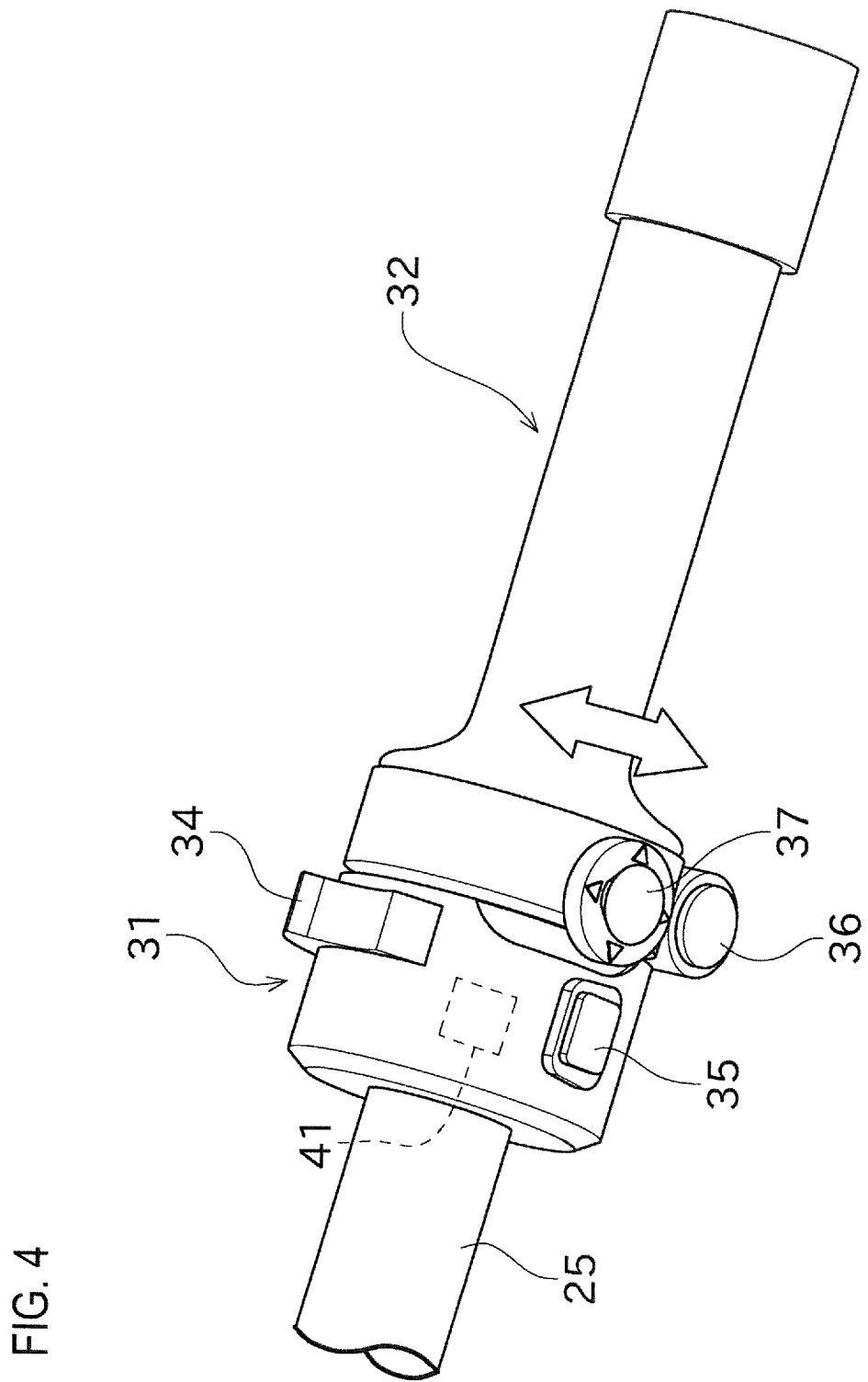
FIG. 4 is a perspective view of the output adjusting grip having been rotated in an output-increasing direction.

A first embodiment will be described with reference to drawings. FIG. 1 is a perspective rear view of a motorcycle 1, FIG. 2 is a perspective view of an output adjusting grip 32 and a casing 31, FIG. 3 is a block diagram of an electric system for controlling a hybrid power source 50, and FIG. 4 is a perspective view of the output adjusting grip 32 having been rotated in an output-increasing direction from its initial position shown in FIG. 2.

First, the motorcycle (serving as a vehicle) 1 will be described with reference to FIG. 1. Hereinafter, "front", "rear", "right" and "left" are designated as directions when viewed from an operator riding the motorcycle 1. A fore-and-aft direction corresponds to a vehicle-length direction, and a right-and-left direction corresponds to a vehicle-width direction. A vertical (up-and-down) direction corresponds to a vehicle-height direction.

Referring to FIG. 1, the motorcycle 1 includes a vehicle body 10, a front wheel 11 and a rear wheel (serving as a wheel) 12.

To drive the rear wheel 11, the motorcycle 1 is equipped with an engine 21 and a driving motor 30. The engine 21 and the driving motor 30 constitute a hybrid power source (serving as a propulsion power source) 50. Therefore, the motorcycle 1 is a hybrid vehicle. In the present embodiment, the motorcycle 1 employs a hybrid system configured so that the motorcycle 1 can travel by power from only the driving motor 30 while the engine 21 is stopped. The rear wheel 12 is driven by power outputted from one or both of the engine 21 and the driving motor 30. The output power from only the engine 21, the output power from only the driving motor 30, or the combination output power from both the engine 21 and the driving motor 30 is selectively transmitted to the rear wheel 12 depending on what the situation is.

The engine 21 is mounted at a fore-and-aft intermediate portion of the vehicle body 10. In the present embodiment, the engine 21 is a gasoline engine which uses fuel stored in a fuel tank 28 to generate the power.

The driving motor 30 is disposed close to the engine 21. The driving motor 30 is an electric motor driven by a battery (not shown) disposed at an appropriate portion of the motorcycle 1. The battery may be configured in any way. For example, it may be a lithium-ion battery.

A swing arm 22 is disposed at a rear portion of the vehicle body 10. The rear wheel 12 is rotatably attached to a rear portion of the swing arm 22. The power generated from the hybrid power source 50 is transmitted to the rear wheel 12 via a drive chain 23, thereby propelling the motorcycle 1 to travel.

A front fork 24 is attached to a front portion of the vehicle body 10 via an upper bracket (not shown), a lower bracket (not shown) and so on. As shown in its front view, the front fork 24 includes right and left portions which are disposed so as to have the front wheel 11 therebetween. A handlebar 25 operable to steer the motorcycle 1 (to serve as a steering operation member) is disposed at a center portion thereof close to a top end of the front fork 24. The handlebar 25 includes a right portion extended rightward from the center portion and a left portion extended leftward from the center portion. When the handlebar 25 is held and rotated by an operator at the right and left portions thereof centered on the center portion thereof, the front wheel 11 turns following the handlebar 25 via the front fork 24 so as to steer the motorcycle 1.

Right and left side mirrors 26 are provided on the right and left portions of the handlebar 25, respectively. A meter instrument 27 is disposed forward from the center portion of the handlebar 25 at a laterally (right-and-left) middle portion of the motorcycle 1. The meter instrument 27 is adapted to indicate an engine rotary speed, a vehicle velocity, and other information.

The fuel tank 28 for storing fuel to be supplied to the engine 21 is disposed rearward from the center portion of the handlebar 25 and above the engine 21. An operator's seat 29 is disposed rearward from the fuel tank 28. The fuel tank 28 and a section below the fuel tank 28 are sandwiched between knees of an operator sitting on the seat 29, thereby physically stabilizing the operator riding the motorcycle 1. The operator who rides the motorcycle 1 in the above-mentioned way can move his/her body so as to move his/her gravity center rightward or leftward, thereby leaning the vehicle body 10 to smoothly steer the motorcycle 1.

Referring to FIGS. 1 and 2, a casing 31 is fixed on a right-and-left distal portion of the handlebar 25, more specifically, a rightwardly distal portion of the right portion of the handlebar 25. An output adjusting grip 32 is provided on a portion of the handlebar 25 more distant from the center portion of the handlebar 25 than the casing 31, more specifically, on the right portion of the handlebar 25 rightward from the casing 31.

The output adjusting grip 32 is fixed to a distal end of a cylindrical throttle tube (not shown). A sectionally circular distal end portion of the handlebar 25 is inserted into the throttle tube. Therefore, the operator can rotate the output adjusting grip 32 centered on an axis 32c parallel to a longitudinal direction of the handlebar 25.

A throttle sensor 41 for detecting an operation position of the throttle tube is disposed inside of the casing 31. The throttle sensor 41 may be configured in any way. For example, a potentiometer may serve as the throttle sensor 41.

Referring to FIG. 3, the throttle sensor 41 is electrically connected to a control unit 46. The control unit 46 is configured as a conventional computer. The engine 21 and the driving motor 30 of the hybrid power source 50 can be drivingly controlled individually by the control unit 46.

A throttle motor 42 and the driving motor 30 are electrically connected to the control unit 46. The throttle motor 42 functions as an actuator for driving a valve element 44 of a throttle valve 45 of the engine 21. The control unit 46 gets a torque required by the operator (hereinafter, this torque may be referred to as "required torque") based on an operation (rotation) angle of the throttle tube (i.e., the output adjusting grip 32) detected by the throttle sensor 41. The control unit 46 controls the throttle motor 42 and the driving motor 30 so that a total output torque of the engine 21 and the driving motor 30 becomes equal to the required torque. The engine 21 is configured so that the throttle motor 42 changes an opening degree of the valve element 44 of the throttle valve 45, thereby adjusting the amount of air sucked into the engine 21 so as to change the torque generated from the engine 21. The driving motor 30 uses a conventional torque control manner for changing the torque generated therefrom.

Referring to FIG. 1, a brake lever 33 is provided on the handlebar 25 so that the operator can grip and rotate the brake lever 33 by his/her right hand holding the output adjusting grip 32.

Referring to FIG. 2, the output adjusting grip 32 is provided with a boost button 36 and a travel mode switch 37 on a proximal end portion thereof closer to the center portion of the handlebar 25 than the distal end portion of the output adjusting grip 32.

The boost button 36 will be described in detail. The hybrid power source 50 can be controlled by a certain operation so as to change a relation between the operation position of the output adjusting grip 32 and the output torque thereof. Hereinafter, the relation is referred to as "torque output characteristic". To change the torque output characteristic, the control unit 46 can select whether or not drive of the driving motor 30 is added to drive of the engine 21, or can change the ratio of the additional drive of the driving motor 30 to the drive of the engine 21.

The boost button 36 is operated by the operator to issue a command to change the torque output characteristic so as to increase the output torque of the hybrid power source 50. Referring to FIG. 3, the boost button 36 is electrically connected to the control unit 46. Hereinafter, the above-mentioned change of torque output characteristic to increase the output torque of the hybrid power source 50 is referred to as "boosting change of torque output characteristic", or simply referred to as "boosting". A drive mode of the hybrid power source 50 indicating a normal torque output characteristic before the boosting is referred to as "normal mode", and a drive mode of the hybrid power source 50 indicating a boosted torque output characteristic after the boosting is referred to as "boost mode". Therefore, the boosting change of torque output characteristic means shift of the drive mode of the hybrid power source 50 from the normal mode to the boost mode.

Various manners are adoptable to perform the boosting change of torque output characteristic. For example, if the normal mode is defined as the drive mode of the hybrid power source 50 in which only the engine 21 is driven, the driving motor 30 is commanded to drive while the drive of the engine 21 is maintained, thereby performing the boosting change of torque output characteristic. If the normal mode is defined as the drive mode of the hybrid power source 50 in which both the engine 21 and the driving motor 30 are driven, a command to increase the amount of electric current supplied to the driving motor 30 is issued while the engine 21 is maintained to output a constant output torque, thereby performing the boosting change of torque output characteristic. The boosting change of torque output characteristic of the hybrid power source 50 enables strong acceleration of the motorcycle 1 for climbing a slope, traveling against a head wind, outrunning someone or something, or another purpose. A boost rate of the output torque of the hybrid power source 50 by setting the boost mode is controlled so as to increase according to increase of the rotation angle of the output adjusting grip 32.

When the normal mode is set and the boost button 36 is pushed, the control unit 46 acts to shift the drive mode of the hybrid power source 50 from the normal mode to the boost mode. If the boost mode is set by increasing the output level of the driving motor 30 added to the output of the engine 20, the control unit 46 desirably returns the drive mode from the boost mode to the normal mode automatically after passing of a predetermined time (e.g., several seconds) of setting the boost mode, thereby returning the output level of the driving motor 30 from the increased (boosting) level to the original (normal) level. Therefore, the driving motor 30 is protected from a large amount of electric current flowing through the driving motor 30 for a long time.

The travel mode switch 37 has four pushed points so that by selectively pushing one of the four pushed points, the travel mode switch 37 can be selectively tilted in one of four directions, i.e., forward, rearward, rightward or leftward, operably to select one of travel modes prepared for the motorcycle 1. Various travel modes can be considered as the prepared travel modes, and they should not be limitative. For example, the prepared travel modes may include a fuel economy mode and a sporty travel mode, so that the fuel economy mode can be selected if the operator attaches importance to fuel economy, and the sporty travel mode can be selected if the operator desires such a travel feeling.

Each of the boost button 36 and the travel mode switch 37 is disposed so that it can be pushed by a thumb of the operator's right hand gripping the output adjusting grip 32. The direction convenient for moving the thumb to push the boost button 36 is generally tangent to the output adjusting grip 32. Therefore, the boost button 36 is disposed so that an operation piece of the boost button 36 can be pushed by the thumb extended along the direction tangent to the adjusting grip 32.

The boost button 36 and the travel mode switch 37 are provided rotatably integrally with the output adjusting grip 32. Therefore, referring to FIG. 4, when the output adjusting grip 32 is rotated relative to the handlebar 25, the boost button 36 and the travel mode switch 37 are rotated together with the output adjusting grip 32.

It is often the case that the boosting command or the travel mode changing command is issued in the state where the output adjusting grip 32 having been rotated to a rotation angle is held at the rotation angle. In this regard, while the output adjusting grip 32 is being rotated to the rotational position, an angle of each of the boost button 36 and the travel mode switch 37 relative to the thumb of the operator's right hand gripping the output adjusting grip 32 is kept constant. As a result, the operability of each of the boost button 36 and the travel mode switch 37 is ensured so that it can be surely operated only by a regular movement of the thumb regardless of which rotation angle the output adjusting grip 32 has been rotated to.

Referring to FIG. 2, the casing 31 is provided with a kill switch 34 and a meter mode switch 35 to issue commands for actions other than the change of the torque output characteristic. Each of the kill switch 34 and the meter mode switch 35 serves as a second operation member.

The boost button 36, the travel mode switch 37, the kill switch 34 and the meter mode switch 35 are all disposed together with the output adjusting grip 32 on one right or left side of the vehicle body 10. Each of the boost button 36, the travel mode switch 37, the kill switch 34 and the meter mode switch 35 serves as an operation member to be operated by the operator to apply a corresponding command to the motorcycle 1.

The kill switch 34 is operable to command a forced stoppage of the engine 21. The meter mode switch 35 is operable to command selection of a matter to be displayed. The casing 31 having the kill switch 34 and the meter mode switch 35 is fixed to the handlebar 25 so as to be unrotatable regardless of rotation of the output adjusting grip 32, as understood from FIG. 4.

It can hardly occur that each of the kill switch 34 and the meter mode switch 35 is operated by an operator's hand holding the output adjusting grip 32 rotated from its initial position. Therefore, these operation members are disposed on the casing 31 fixed to the handlebar 25, thereby achieving a rational layout of operation equipment. Operation members rotatable integrally with the output adjusting grip 32 are limited to only the boost button 36 and the travel mode switch 37, thereby preventing rotatable parts from becoming excessively heavy. As a result, the output adjusting grip 32 can be lightly operated.

What the control unit 46 controls will now be described.

While the motorcycle 1 is being leaned rightward or leftward for overtaking, steering or another purpose, the above-mentioned boosting operation of the boost button 36 is valid to actually set the boost mode. However, the boost mode cannot be set during a braking operation. In this regard, a sensor (not shown) for detecting whether or not the brake lever 33 is operated for braking (i.e., whether or not the braking operation is performed) is electrically connected to the control unit 46. The control unit 46 invalidates the boosting operation of the boost button 36 when the sensor detects that the brake operation is performed. Therefore, while the motorcycle 1 is braked, the normal mode set as the drive mode of the hybrid power source 50 is kept from being shifted to the boost mode.

The meter instrument 27 is electrically connected to the control unit 46. When the drive mode is shifted to the boost mode, the control unit 46 commands the meter instrument 27 to display that the boost mode is set, thereby informing an operator that the drive mode has been shifted to the boost mode. Alternatively, the boost button 36 may be configured to incorporate a lamp which is lighted when the boost mode is set.

As mentioned above, the motorcycle 1 according to the first embodiment comprises the hybrid power source 50, the handlebar 25, the output adjusting grip 32, and the boost button 36. The handlebar 25 is operable to steer the motorcycle 1. The output adjusting grip 32 is provided on either the right or left portion of the handlebar 25 operably so that an output level of the hybrid power source 50 is adjusted by rotating the output adjusting grip 32 relative to the handlebar 25. The boost button 36 is operable to issue the command to change the torque output characteristic of the hybrid power source 50. The boost button 36 is provided on the same right or left portion of the handlebar 25 with the output adjusting grip 32 so as to be rotatable integrally with the output adjusting grip 32.

Therefore, a position of the boost button 36 relative to the output adjusting grip 32 is constant regardless of rotation of the output adjusting grip 32 relative to the handlebar 25. Accordingly, the boost button 36 can be easily operated by a finger (thumb) of an operator's hand gripping and rotating the output adjusting grip 32.

In the motorcycle 1 according to the first embodiment, the boost button 36 is attached to the output adjusting grip 32.

Therefore, due to such a simple configuration, the boost button 36 becomes rotatable integrally with the output adjusting button 32.

In the motorcycle 1 according to the first embodiment, the boost button 36 is disposed on one end portion of the output adjusting grip 32 closer to the center portion of the handlebar 25 between the right and left portions of the handlebar 25 than the other end portion of the output adjusting grip 32.

Therefore, the boost button 36 can be operated to issue the command to change the torque output characteristic of the hybrid power source 50 (hereinafter, simply referred to as "the torque output characteristic changing command") by a thumb of an operator's hand gripping the output adjusting grip 32. Accordingly, the torque output characteristic changing command can be issued while the output adjusting grip 32 is surely gripped by fingers other than the thumb.

The motorcycle 1 according to the first embodiment comprises the kill switch 34 and the meter mode switch 35 which are operable to issue commands other than the torque output characteristic changing command. The kill switch 34 and the meter mode switch 35 are disposed on the same right or left portion of the handlebar 25 with the output adjusting grip 32, so that the kill switch 34 and the meter mode switch 35 are unrotatable regardless of rotation of the output adjusting grip 32.

Therefore, the number of operation members can be increased so that various commands can be given to the motorcycle 1. Operations that can hardly be performed simultaneously with operation of the output adjusting grip 32 are allotted to the kill switch 34 and the meter mode switch 35, thereby preventing the degradation in operativity of the whole operation equipment. The kill switch 34 and the meter mode switch 35 do not belong to rotatable operation parts including the output adjusting grip 32, thereby lightening the rotatable operation parts. Therefore, a small operation force is merely required to rotate the output adjusting grip 32, thereby improving the output adjusting grip 32 in operativity.

The motorcycle 1 according to the first embodiment comprises the meter instrument 27 serving as a display device for displaying whether or not the torque output characteristic is changed.

Therefore, the operator can visually confirm whether or not the torque output characteristic is changed.

In the motorcycle 1 according to the first embodiment, the hybrid power source 50 includes the driving motor 30. The torque output characteristic is changed by rotating the driving motor 30 or by increasing the rotation speed of the driving motor 30.

Therefore, the change of output characteristic of the hybrid power source 50 can be easily realized.

The motorcycle 1 according to the first embodiment is configured to travel by rotating the rear wheel 12 driven by the hybrid power source 50.

Therefore, the operator riding the motorcycle 1 with his/her hand gripping the output adjusting grip 32 can easily issue the torque output characteristic changing command.

In the motorcycle 1 according to the first embodiment, the change of the torque output characteristic of the hybrid power source 50 is the boosting that changes the normal torque output characteristic to the boosted torque output characteristic to increase the output torque of the hybrid power source 50.

Therefore, the motorcycle 1 can be strongly accelerated at need, thereby being improved in operation facilitation.

Figure 5:
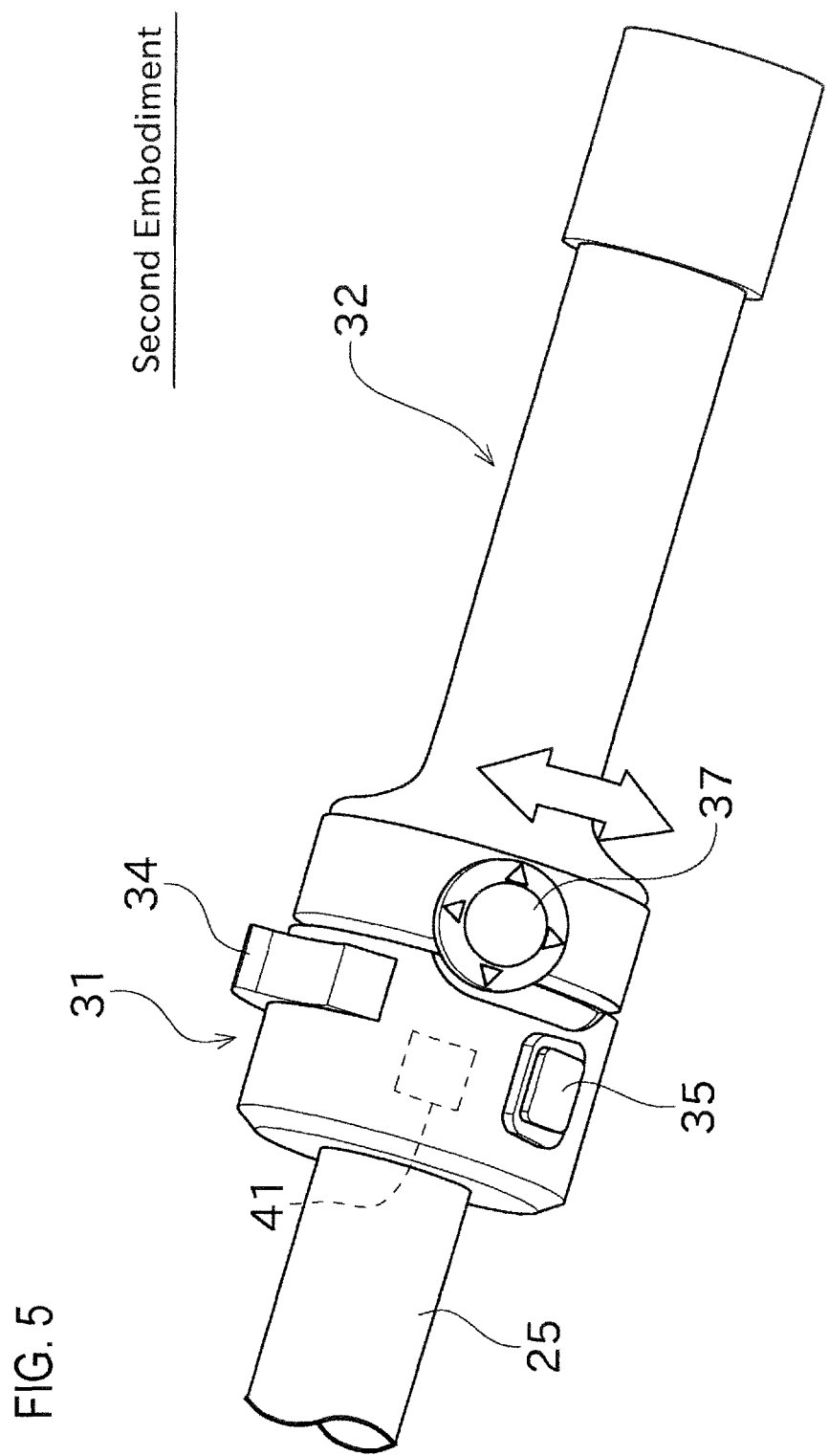
FIG. 5 is a perspective view of an output adjusting grip and a casing according to a second embodiment.

A second embodiment will now be described. FIG. 5 is a perspective view of the output adjusting grip 32 and the casing 31 according to the second embodiment. In the following description regarding the second embodiment, members and portions identical or similar to corresponding members and portions in the first embodiment are designated by the same reference numerals as those in the first embodiment, and description of the members and portions may be omitted.

In the second embodiment, referring to FIG. 5, the motorcycle 1 is provided with no member corresponding to the boost button 36 in the first embodiment.

In this regard, in the second embodiment, the command to shift the drive mode of the hybrid power source 50 to the boost mode, i.e., the boost mode setting command can be issued by rotating the output adjusting grip 32. More specifically, in the normal mode, the output adjusting grip 32 can be rotated in an output-increasing direction from its non-operation (i.e., initial) position so as to gradually increase an output level of the engine 21 until the rotated output adjusting grip 32 reaches a predetermined rotational position (i.e., angle) corresponding to the maximum output of the engine 21. The output adjusting grip 32 can be additionally rotated further in the output-increasing direction from the predetermined rotational position. The control unit 46 acts to set the boost mode when the additional rotation of the output adjusting grip 32 is detected by the throttle sensor 41.

Due to this configuration, the operator gripping the output adjusting grip 32 with his/her hand can easily issue the boost mode setting command. In the second embodiment, the motorcycle 1 includes no physical operation member corresponding to the boost button 36, thereby reducing costs.

The output adjusting grip 32 is configured so as to receive an appropriate resistance when the output adjusting grip 32 having reached the predetermined rotational position corresponding to the maximum output of the engine 21 is going to rotate further from the predetermined rotational position. Any configuration may be employed to apply the resistance against the rotation of the output adjusting grip 32 further from the predetermined rotational position. For example, a detent mechanism may serve as this configuration. The operator can issue the boost mode setting command by rotating the output adjusting grip 32 so as to overcome a moderation feeling imparted when the output adjusting grip 32 rotates across the predetermined rotational position.

Due to the moderation feeling, the operator can clearly recognize a difference in a rotational stroke of the output adjusting grip 32 between a range for adjusting the output level of the engine 21 and a range for issuing the boost mode setting command (commanding the driving motor 30 to drive for assisting the drive of the engine 21), thereby preventing the output adjusting grip 32 from being incorrectly operated to issue the boost mode setting command.

As mentioned above, the motorcycle 1 according to the second embodiment comprises the hybrid power source 50, the handlebar 25, and the output adjusting grip 32. The handlebar 25 is operable to steer the motorcycle 1. The output adjusting grip 32 is disposed on either the right or left portion of the handlebar 25 operably so that the output level of the hybrid power source 50 is adjusted by rotating the output adjusting grip 32 relative to the handlebar 25. The output adjusting grip 32 is configured so that the command to change the torque output characteristic of the hybrid power source 50 can be issued by rotating the output adjusting grip 32 further in the output-increasing direction from the predetermined rotation angle after the output adjusting grip 32 rotated in the output-increasing direction reaches the predetermined rotation angle.

Therefore, the operator gripping and rotating the output adjusting grip 32 with his/her hand can easily issue the torque output characteristic changing command. The output adjusting grip 32 serves as a common operation member used for both the issue of the torque output characteristic changing command and the output adjustment, thereby reducing costs for producing the motorcycle 1.

In the motorcycle 1 according to the second embodiment, the output adjusting grip 32 is configured to generate the moderation feeling when the output adjusting grip 32 rotated in the output-increasing direction reaches the predetermined rotation angle. The torque output characteristic changing command can be issued by rotating the output adjusting grip 32 in the output-increasing direction beyond the predetermined rotation angle where the moderation feeling is generated.

Therefore, the operator can receive the moderation feeling at his/her hand gripping the output adjusting grip 32 so as to recognize a boundary between one rotational range of the output adjusting grip 32 used to issue the torque output characteristic changing command and the other rotational range of the output adjusting grip 32 that is not used to issue the torque output characteristic changing command.

The above-mentioned various configurations adopted in the motorcycle 1 according to the first embodiment can be also adopted in the motorcycle 1 according to the second embodiment as far as they are adaptable, and their effects are also as mentioned above.

The foregoing description is given to preferred embodiments. The embodiments can be modified in any way, for example, as follows.

At least one of the kill switch 34, the meter mode switch 35 and the travel mode switch 37 may be replaced with another operation member operable for another purposed operation. At least a part of one of the kill switch 34, the meter mode switch 35 and the gravel mode switch 37 may be omitted.

The boost button 36 or the travel mode switch 37 may be provided not on the output adjusting grip 32 but on another member rotatable integrally with the output adjusting grip 32.

Instead of the above-mentioned hybrid system, the hybrid power source 50 may employ another hybrid system configured so that the engine 21 serves as a main power source and the driving motor 30 serves as an auxiliary power source assisting the drive of the engine 21. In the case where this alternative hybrid system is employed, the change of torque output characteristic can be realized by deciding whether or not the drive of the driving motor 30 is added to the drive of the engine 21 (i.e., whether or not the driving motor engine 30 is driven to assist the engine 21).

Instead of the hybrid power source, only an engine or only an electric motor may serve as the propulsion power source. In the case where the propulsion power source consists of only the engine, the change of torque output characteristic can be performed by making the opening degree of the throttle valve corresponding to each operation position of the output adjusting grip 32 greater than that in a normal mode. In the case where the propulsion power source consists of only the electric motor, the change of torque output characteristic can be performed by making the quantity of current supplied to the electric motor more than that in a normal mode.

The boost button 36 or the travel mode switch 37 may be disposed at an appropriate position other than the above-mentioned position. For example, at least either the boost button 36 or the travel mode switch 37 can be disposed at a position convenient for an operator to operate it by his/her index finger or so on.

The valve element 44 of the throttle valve 45 may be mechanically operable to change its angle by wiring the throttle tube with a throttle wire (not shown).

Not only the motorcycle serving as a two-wheeled vehicle but also any other vehicle such as a three-wheeled or four-wheeled vehicle can serve as the present vehicle. Further, the above-mentioned embodiments are adaptable to a personal water craft or so on.

A handlebar of the present vehicle for steering the vehicle is not limited to the above-disclosed handlebar including the center portion via which the right and left bar portions are continuously joined to each other. The handlebar may have right and left bar portions separated from each other.

It is further understood by those skilled in the art that the foregoing description is given to preferred embodiments of the disclosed vehicle and that various changes and modifications may be made in the invention without departing from the scope thereof defined by the following claims.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A vehicle, comprising:
   a propulsion power source;
   a handlebar operable to steer the vehicle;
   an output adjusting grip disposed on either a right or left portion of the handlebar operably so that an output level of the propulsion power source is adjusted by rotating the output adjusting grip relative to the handlebar; and
   a torque operation switch operable to issue a command to change a torque output characteristic of the propulsion power source, the torque operation switch being disposed on the same right or left portion of the handlebar with the output adjusting grip so as to be rotatable integrally with the output adjusting grip.

2. The vehicle according to claim 1, wherein the torque operation switch is attached to the output adjusting grip.

3. The vehicle according to claim 1, wherein the torque operation switch is disposed on one end portion of the output adjusting grip closer to a center portion of the handlebar between the right and left portions of the handlebar than the other end portion of the output adjusting grip, or on a portion of the handlebar closer to the center portion of the handlebar than the output adjusting grip.

4. The vehicle according to claim 1, further comprising:
   a second operation switch operable to issue a command other than the command to change the torque output characteristic,
   wherein the second operation switch is disposed on the same right or left portion of the handlebar with the output adjusting grip, so that the second operation switch is unrotatable regardless of rotation of the output adjusting grip.

5. The vehicle according to claim 1, further comprising:
   a display device displaying whether or not the torque output characteristic is changed.

6. The vehicle according to claim 1, wherein the propulsion power source includes a motor, and wherein the torque output characteristic is changed by rotating the motor or by increasing a rotation speed of the motor.

7. The vehicle according to claim 1, wherein the vehicle is configured to travel by rotating a wheel driven by the propulsion power source.

8. The vehicle according to claim 1, wherein the change of the torque output characteristic of the propulsion power source is a boosting that changes a normal torque output characteristic to a boosted torque output characteristic to increase an output torque of the propulsion power source.

9. The vehicle according to claim 1, wherein the output adjusting grip is configured so that a command to change a torque output characteristic of the propulsion power source can be issued by rotating the output adjusting grip further in an output-increasing direction from a predetermined rotation angle after the output adjusting grip rotated in the output-increasing direction reaches the predetermined rotation angle.

10. The vehicle according to claim 1, wherein the torque operation switch is disposed at a position so that an operator can push the torque operation switch with their thumb of their hand that grips the output adjusting grip.

11. The vehicle according to claim 1, wherein the torque operation switch is disposed rearward of the output adjusting grip.

12. The vehicle according to claim 1, wherein the propulsion power source includes an engine and a driving motor.

13. The vehicle according to claim 12, further comprising:
    a control unit configured to control the engine and the driving motor,
    wherein the change of the torque output characteristic occurs when the control unit switches the addition of drive of the driving motor to drive of the engine, or a ratio of the additional drive.

14. The vehicle according to claim 1, wherein the change of the torque output characteristic occurs when a travel mode of the vehicle is switched.

15. The vehicle according to claim 1, further comprising:
    an operation equipment, the operation equipment and the torque operation switch being rotatable integrally with the output adjusting grip.

16. The vehicle according to claim 1, wherein the change of the torque output characteristic of the propulsion power source is disabled when a braking operation is detected.

* * * * *